United States Patent [19]

Nanjyo

[11] Patent Number: 5,050,024
[45] Date of Patent: Sep. 17, 1991

[54] DOUBLE AZIMUTH MAGNETIC HEAD WITH TWO-PIECE ADJUSTABLE BASE

[75] Inventor: Shinichi Nanjyo, Miyagi, Japan
[73] Assignee: Sony Corporation, Tokyo, Japan
[21] Appl. No.: 471,391
[22] Filed: Jan. 29, 1990

[30] Foreign Application Priority Data

Jan. 31, 1989 [JP] Japan .................................. 1-21177

[51] Int. Cl.⁵ .......................... G11B 5/48; G11B 21/16
[52] U.S. Cl. .............................. 360/104; 360/130.22; 360/109; 360/76; 360/121
[58] Field of Search .......................... 360/84, 104–109, 360/102, 103, 130.22–130.24, 137, 77.02, 121, 129, 75–76

[56] References Cited

U.S. PATENT DOCUMENTS

| 4,497,005 | 1/1985 | Heinz | 360/109 X |
| 4,713,710 | 12/1987 | Soda et al. | 360/121 |
| 4,897,745 | 1/1990 | Binder-Kriegelstein | 360/109 X |

FOREIGN PATENT DOCUMENTS

| 59-193517 | 2/1984 | Japan | 360/121 |
| 62-279501 | 12/1987 | Japan | 360/76 |
| 63-46616 | 2/1988 | Japan | 360/109 |
| 63-220407 | 9/1988 | Japan | 360/76 |
| 1-159821 | 6/1989 | Japan | 360/76 |
| 1-263906 | 10/1989 | Japan | 360/76 |
| WO88/06333 | 8/1988 | PCT Int'l Appl. | |

Primary Examiner—David J. Severin
Assistant Examiner—Alfonso Garcia
Attorney, Agent, or Firm—Hill, Van Santen, Steadman & Simpson

[57] ABSTRACT

A double base type double azimuth magnetic head including two head bases and a pair of head chips bonded and anchored thereto respectively. The two head bases integrally have anchor lugs with flat reverse surfaces for anchoring the head chips thereto. The head bases further have joint regions partially and are joined to each other at the surfaces of the joint regions in such a manner that the anchor lugs are placed mutually adjacent in the same direction and the reverse surfaces of the anchor lugs become flush with each other. The pair of anchored head chips are so disposed as to constitute a double azimuth head while being positioned mutually adjacent on one line with a predetermined gap left therebetween, and screw-setting circular apertures are formed in the joined head bases for attachment to a rotary drum. Due to such a structure, the operation of winding coils around the head chips can be automated, and the dimensional precision is enhanced.

16 Claims, 15 Drawing Sheets

FIG. IIA 
FIG. IIB 
FIG. IIC 
FIG. IID 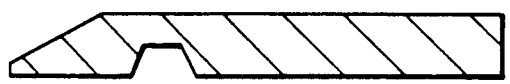
FIG. 12
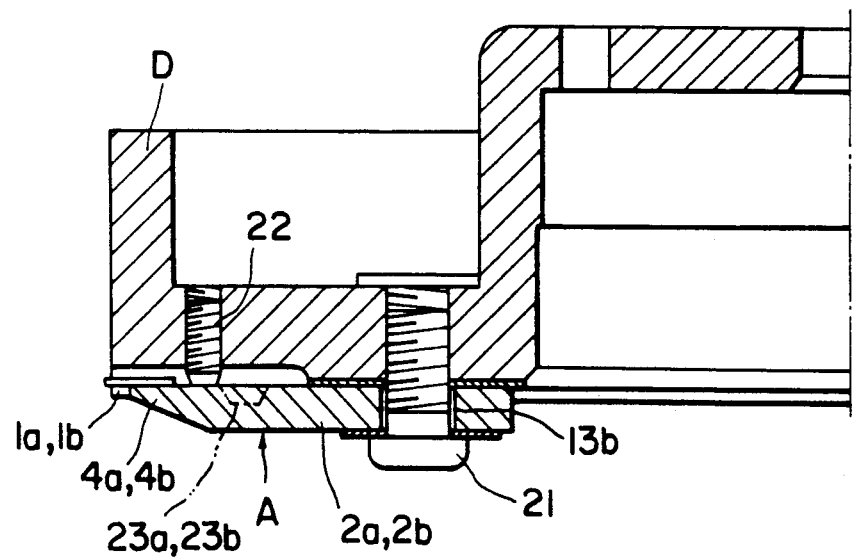

DOUBLE AZIMUTH MAGNETIC HEAD WITH TWO-PIECE ADJUSTABLE BASE

BACKGROUND OF THE INVENTION

1. Field of the Invention

The present invention relates to a double base type double azimuth magnetic head which is attached to a rotary drum for use as a recording/reproducing head in a magnetic recording/reproducing apparatus such as a video tape recorder (VTR).

2. Description of the Prior Art

In an ordinary VTR, generally a magnetic head H is attached to a rotary drum D as illustrated in FIG. 16 and serves to record a signal on and/or to reproduce the same from a magnetic tape wound around the rotary drum D. Head chips 31 constituting the magnetic head are attached to a head base 32 in such a manner that, as illustrated in FIG. 17, the head chips 31 are positioned on a projection 33 at the fore end of the head base 32. And the head base 32 holding the head chips 31 thereon is secured to the rotary drum D by means of a screw 34.

In a VTR of another type designed to perform variable speed reproduction, as illustrated also in FIG. 17, two head chips 31 are attached to the projection 33 of the head base 32 so as to constitute a double azimuth head. Such magnetic head is similar to the known example disclosed in Japanese Utility Model Laid-open No. 60 (1985)-70916.

In assembling such conventional double azimuth head, first the two head chips 31 are anchored to the head base 32 and, after coils are wound around the two head chips 31 respectively, a test is carried out by measuring the output characteristics of the two head chips. Therefore it becomes necessary to wind coils respectively around the two head chips 31 which are in extreme proximity to each other, thereby rendering the winding operation difficult or requiring a long operation time with another disadvantage of inducing difficulty for automation. Furthermore, in case one of the head chips 31 is found defective as a result of such test, it follows that both head chips are compelled to be discarded to consequently bring about waste.

In addition to the above problems, there exists in the double azimuth head the necessity of minimizing the dimensional error within a predetermined precision range of several microns or so with regard to the difference d between the distances a and b from the upper surface of the head base 32 to the edges of the respective gaps g of the two head chips 31 shown in FIG. 18. However, in manufacture of the head chips 31, some variations on the order of ±10 microns are caused in the dimensional values of the distances a and b. Therefore the head chips 31 manufactured are dimensionally classified into ranks by the distances a and b to form selected pairs, and then a pair of such selected head chips are joined to the base 32. However, classifying the head chips into ranks necessitates another step for selection of adequate head chips to consequently bring about additional labor for assembly of the heads with another disadvantage of increased production cost.

OBJECT AND SUMMARY OF THE INVENTION

It is therefore an object of the present invention to provide an improved magnetic head where the coil winding operation for a double azimuth head can be automated with elimination of wasteful discard of any satisfactory head chip, and the assembly can be facilitated while ensuring high dimensional precision in three directions (with regard to the relative height of the head to the rotary drum and the relative height between the two head chips the projection lengths of the two head chips for mutually aligning the surfaces thereof opposed to a magnetic recording medium; and the transverse space between the two head chips).

For the purpose of achieving the object mentioned, the feature of the present invention resides in that a pair of head chips are bonded and anchored respectively to two head bases produced as individual members, and a double azimuth head is constituted of such head chips by joining the head bases to each other in a state where the chip-anchored surfaces thereof are positioned on the same side. Due to such a structure and method for manufacture, the operation of winding coils around the head chips can be automated with another advantage of eliminating the waste that, in case one of the head chips is defective, the other satisfactory head chip is also compelled to be discarded.

According to one aspect of the present invention, there is provided a double base type double azimuth magnetic head comprising two head bases and a pair of head chips bonded and anchored thereto respectively. The two head bases integrally have anchor lugs with flat reverse surfaces for anchoring the head chips thereto. The head bases further have joint regions partially and are joined to each other at the surfaces of the joint regions in such a manner that the anchor lugs are placed mutually adjacent in the same direction and the reverse surfaces of the anchor lugs become flush with each other. The pair of anchored head chips are so disposed as to constitute a double azimuth head while being positioned mutually adjacent on one line with a predetermined gap left therebetween, and screw-setting circular holes are formed in the joined head bases for attachment to a rotary drum.

BRIEF DESCRIPTION OF THE DRAWINGS

FIG. 11A-11D is a sectional view illustrating exemplary shapes of the groove in the second embodiment;

FIG. 12 is a partially omitted sectional view illustrating how the magnetic head is attached to the rotary drum in the first and second embodiments;

DESCRIPTION OF THE PREFERRED EMBODIMENTS

Hereinafter exemplary embodiments of the present invention will be described with reference to FIGS. 1 through 12.

Figure 1:
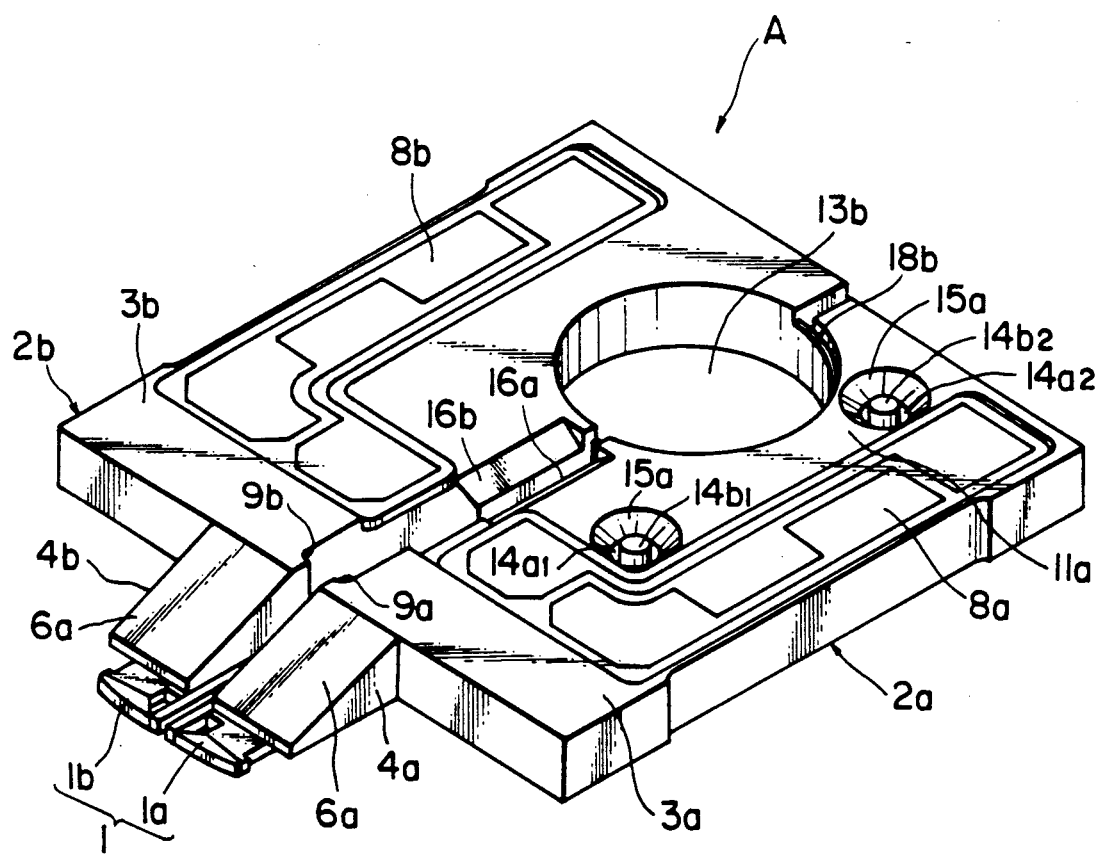
FIG. 1 is an assembled perspective view showing the constitution of a magnetic head contrived as a first embodiment of the present invention.
Figure 2:
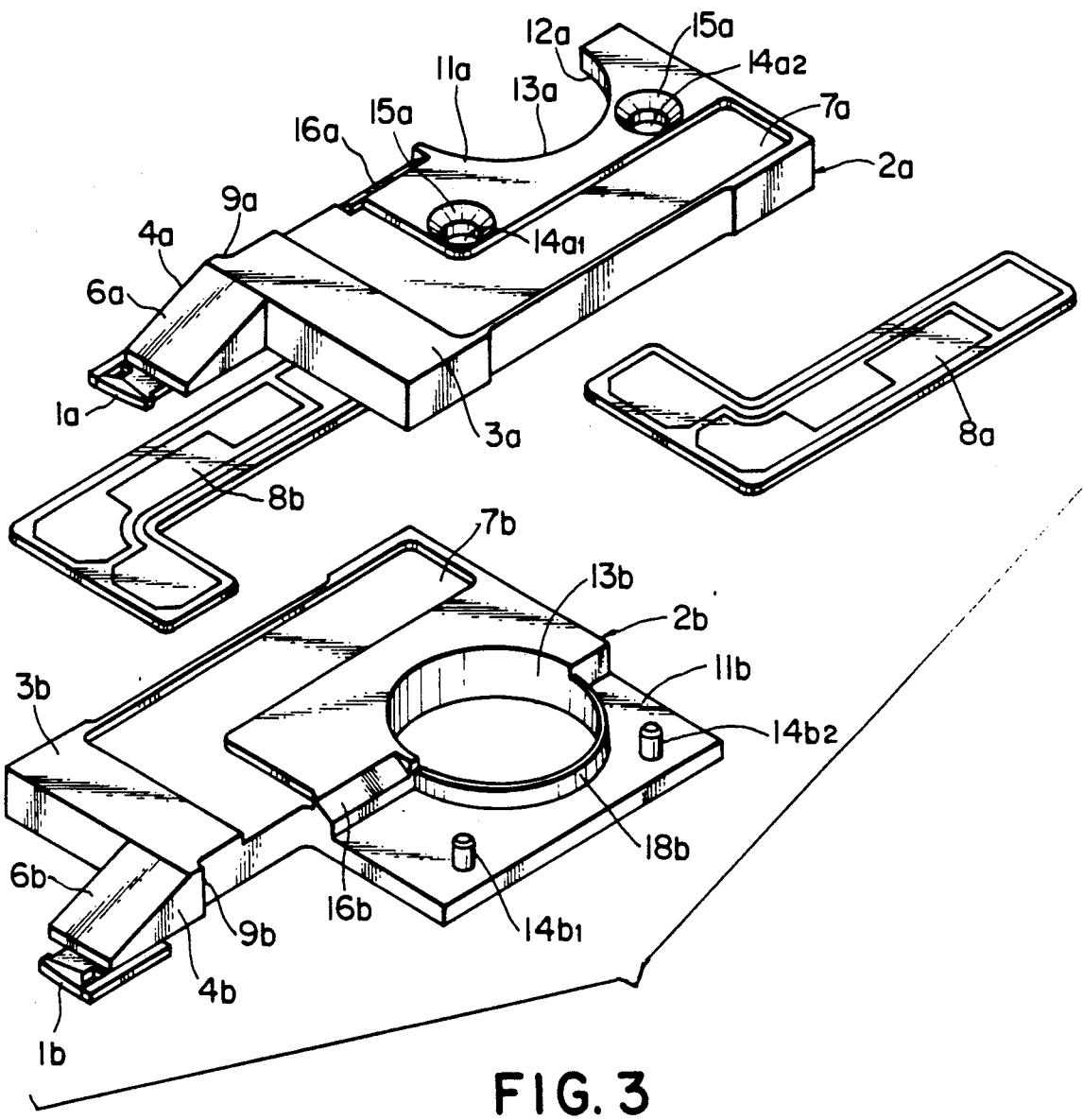
FIG. 2 is an exploded perspective view of the first embodiment.
Figure 3:
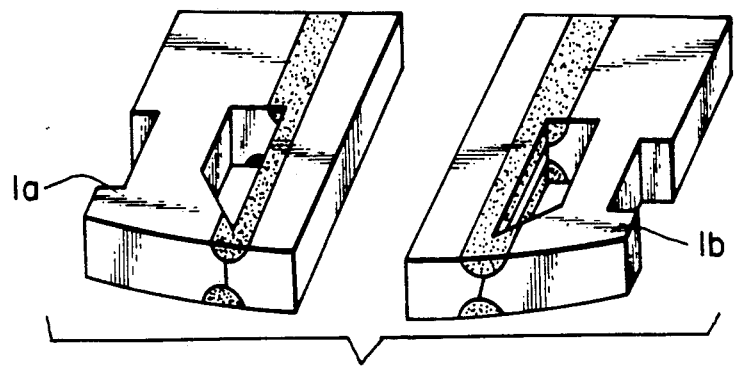
FIG. 3 is an enlarged perspective view of head chips.
Figure 4A:
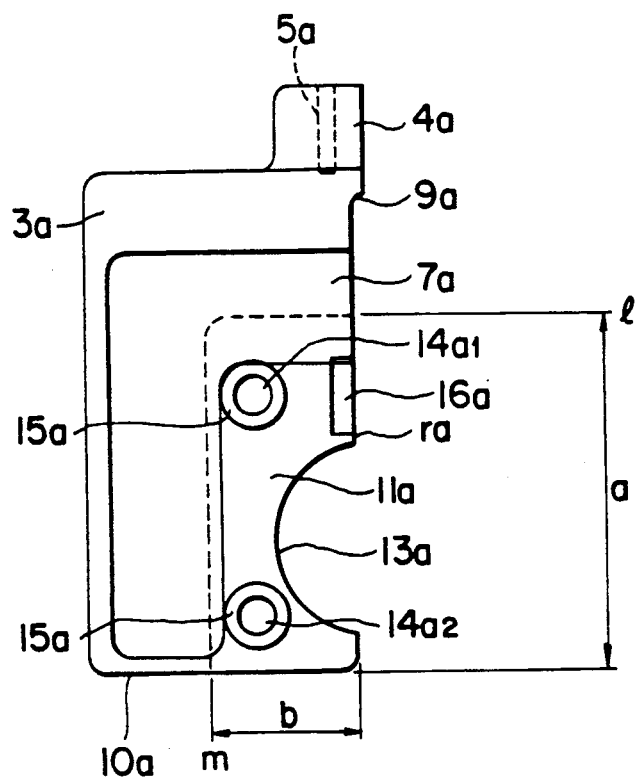
FIGS. 4A, 4B and 4C are a plan view, a rear view and a side view respectively of one head base in the first embodiment.
Figure 4C:
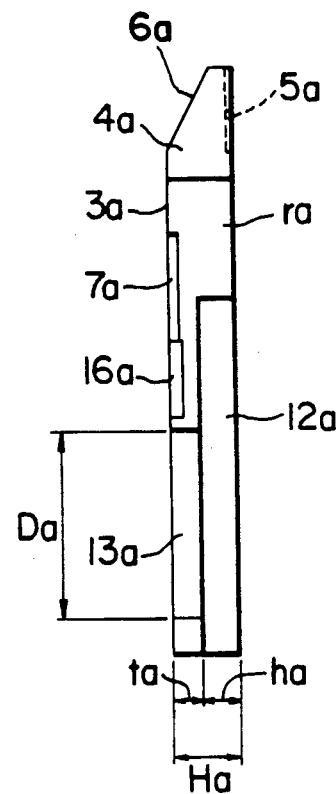
Figure 4B:
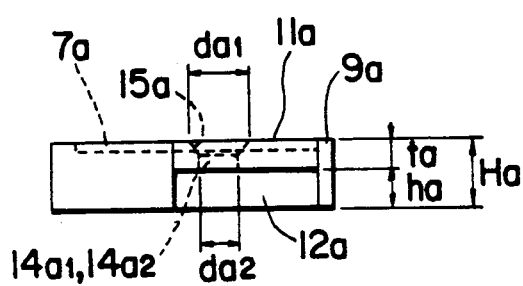
Figure 5A:
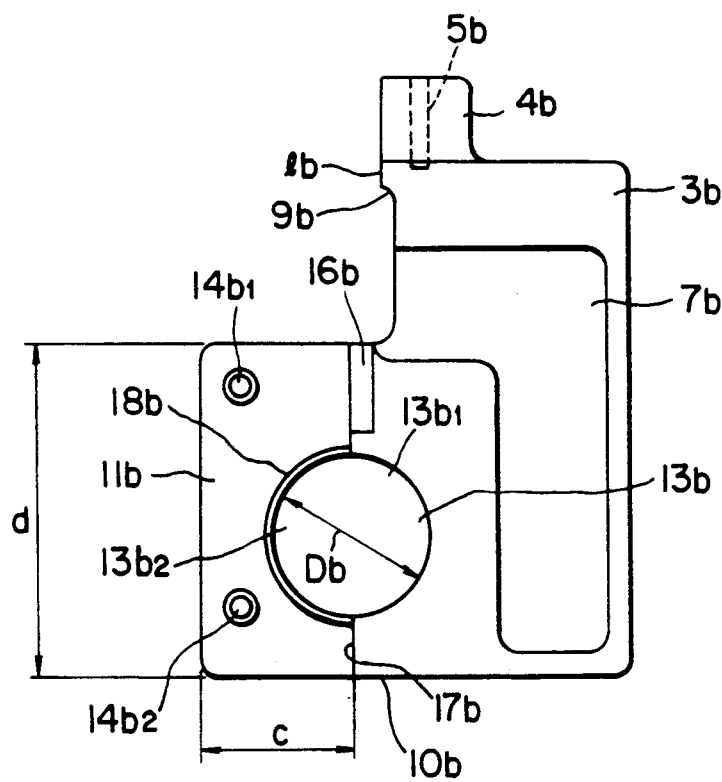
FIGS. 5A, 5B and 5C are a plan view, a rear view and a side view respectively of the other head base in the first embodiment.
Figure 5C:
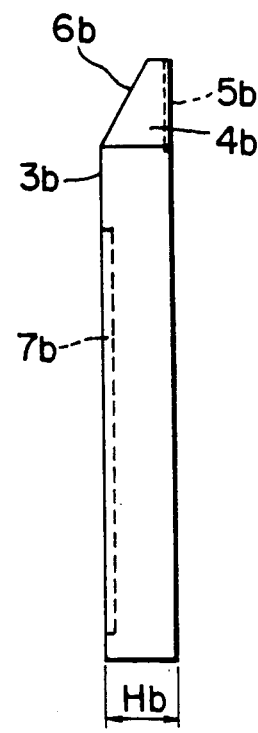
Figure 5B:
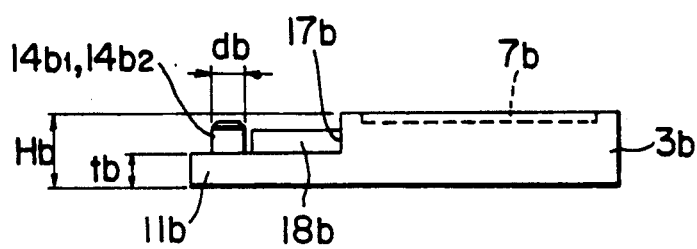
Figure 6A:
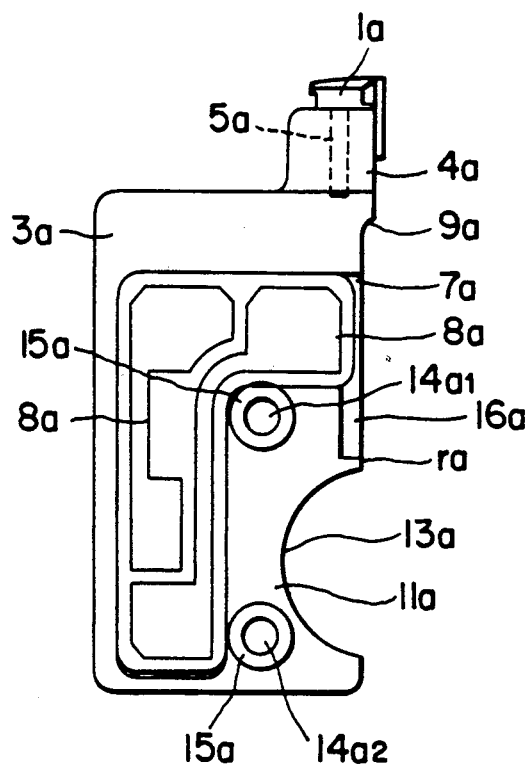
FIGS. 6A, 6B and 6C are a plan view, a rear view and a side view respectively of the magnetic head (shown with one head base) before the joining stage in the first embodiment.
Figure 6C:
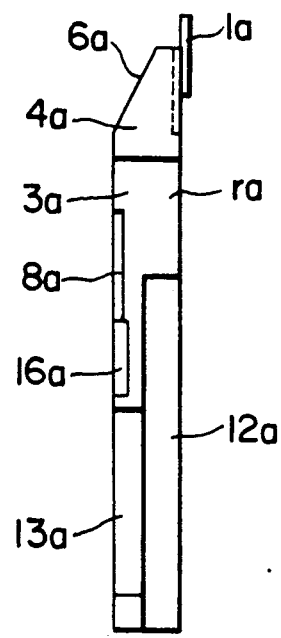
Figure 6B:
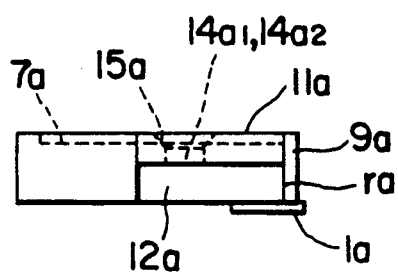
Figure 7A:
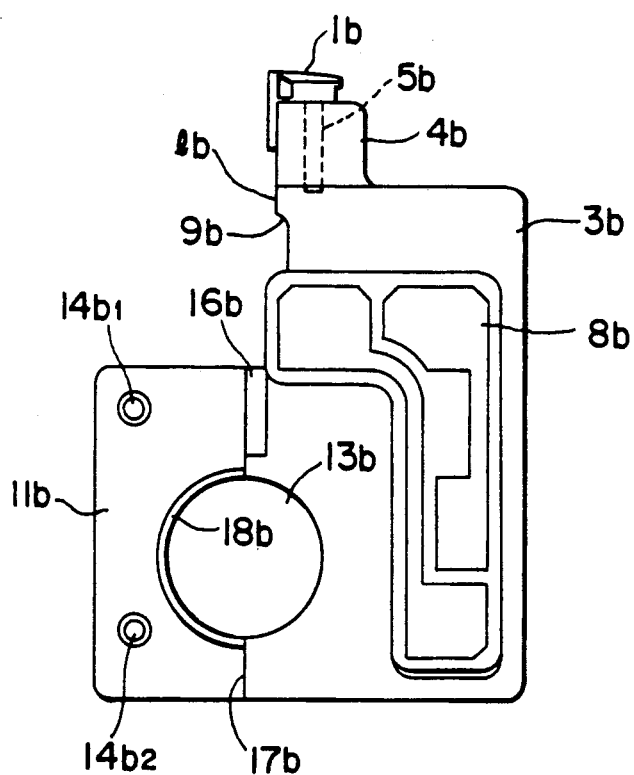
FIGS. 7A, 7B and 7C are a plan view, a rear view and a side view respectively of the magnetic head (shown with the other head base) before the joining stage in the first embodiment.
Figure 7C:
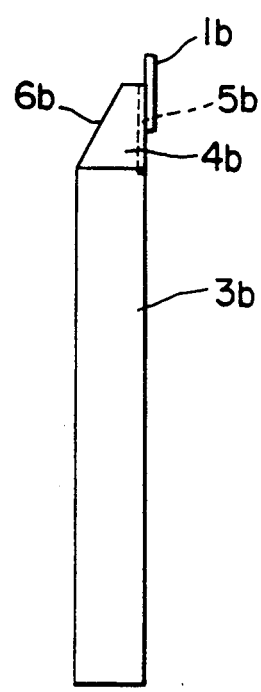
Figure 7B:
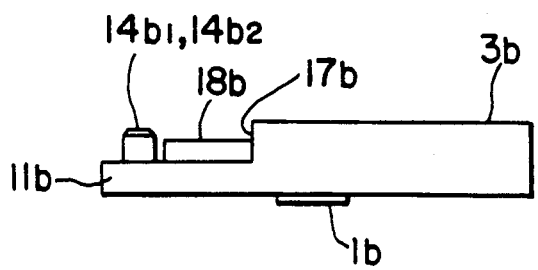

FIG. 1 is an assembled perspective view showing the constitution of a double base type double azimuth magnetic head A contrived as a first embodiment, and FIG. 2 is an exploded perspective view of such magnetic head. Denoted by $1a$, $1b$ in these diagrams are a pair of head chips constituting a double azimuth head 1 which is also illustrated in an enlarged view of FIG. 1. Such head chips $1a$, $1b$ are bonded and anchored respectively to the fore ends of head bases $2a$, $2b$.

Now a detailed description will be given on the structure of the head bases $2a$, $2b$ with reference to FIGS. 4 through 8. First the head base $2a$ integrally comprises a main surface portion $3a$ to which a flexible printed circuit board is to be stuck, and an anchor lug $4a$ to which the head chip $1a$ is to be anchored.

A groove $5a$ is formed on the reverse side of the anchor lug $4a$ so as to serve as an escape groove for leading in an adhesive compound used for bonding the head chip $1a$. Meanwhile a slope $6a$ is formed on the obverse side of the anchor lug $4a$.

The main surface portion $3a$ has an L-shaped recess $7a$ on its obverse side in such a manner that a flexible printed circuit board $8a$ can be stuck to the recess $7a$ with an adhesive compound. A step $9a$ is formed on one side $r_a$ (right side in FIGS. 4A and 6A) of the main surface portion $3a$ so that the anchor lug $4a$ slightly projects rightward in the drawing. And in the main surface portion $3a$, there is defined a joint region $11a$ which is surrounded with a line l extending substantially from the center of the L-shaped recess on one side $r_a$ (distance a from the other end face $10a$), a line m extending from a position slightly left of the center of the other end face $10b$ (distance b from one side face $r_a$), one side face $r_a$ and the other end face $10a$. Such joint region $11a$ surrounded with the four faces is shaped to have, from the surface thereof, a thickness $t_a$ which is smaller than the thickness $H_a$ of the head base $2a$ (i.e. $H_a > t_a$), and simultaneously the reverse side of the joint region $11a$ is formed with a recess $12a$ of a height $h_a$. A thin region $11b$ of the undermentioned other head base $2b$ is fitted into the recess $12a$ so that the region $11a$ and the thin region $11b$ are joined to each other with the respective reverse and obverse surfaces mutually opposed. Hereinafter the aforesaid region $11a$ and thin region $11b$ will be referred to as joint regions $11a$ and $11b$, respectively.

A semicircular recess $13a$ is formed on one side $r_a$ of the joint region $11a$, and two through-holes $14a_1$, $14a_2$ are formed between the L-shaped recess $7a$ and the semicircular recess $13a$. Each of such through-holes $14a_1$, $14a_2$ has a tapered face $15a$ extending substantially from the center of the thickness toward the obverse surface so that the obverse diameter $da_1$ becomes greater than the bottom diameter $da_2$. And a slope $16a$ is formed above (in the drawing) the semicircular recess $13a$ on one side $r_a$ of the joint region $11a$.

Meanwhile, the head base $2b$ also integrally comprises a main surface portion $3b$ to which a flexible printed circuit board $8b$ is to be stuck, and an anchor lug $4b$ to which a head chip $1b$ is to be anchored, similarly to the aforementioned head base $2a$.

In the anchor lug $4b$, a groove $5b$ is formed on its reverse side as in the anchor lug $4a$ of the head base $2a$, and a slope $6b$ is formed on the obverse side similarly to the aforementioned one.

Figure 8A:
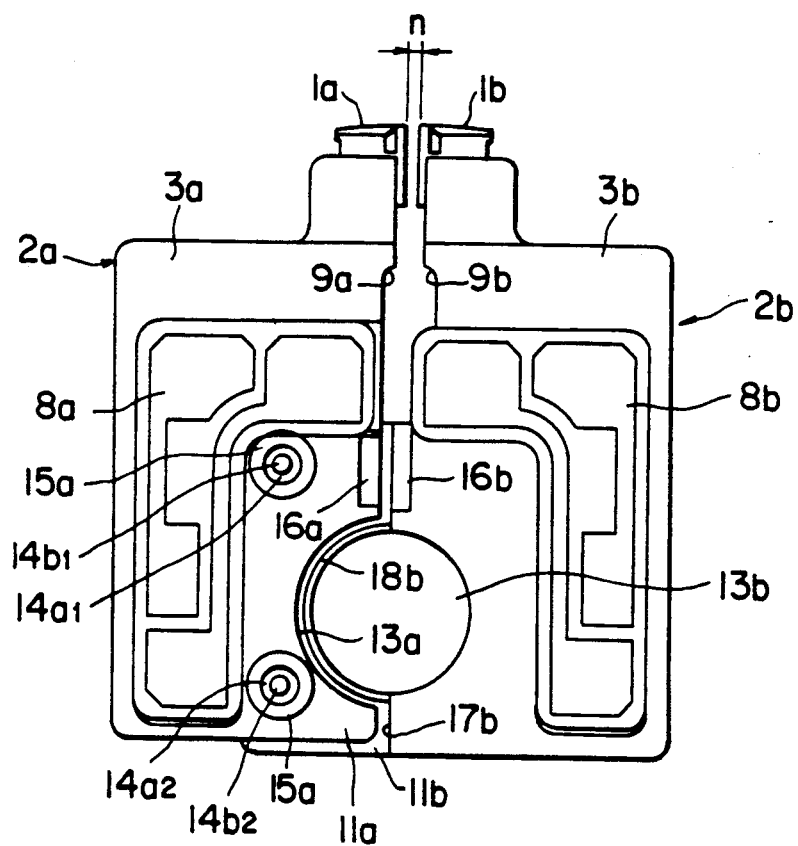
FIGS. 8A and 8B are a plan view and a rear view respectively of the magnetic head after the joining stage in the first embodiment.
Figure 8B:
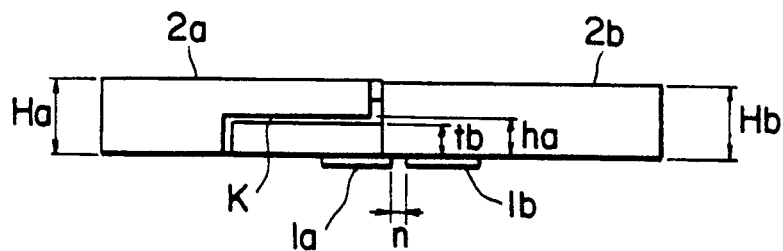
Figure 9A:
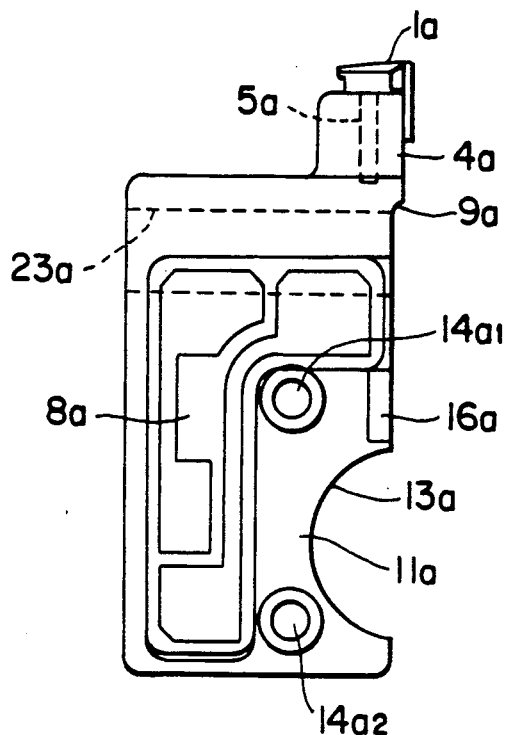
FIGS. 9A, 9B and 9C are a plan view, a rear view and a side view respectively of the magnetic head (shown with one head base) before the joining stage in the second embodiment.
Figure 9C:
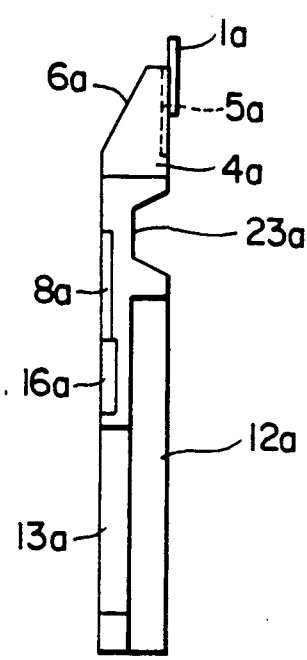
Figure 9B:
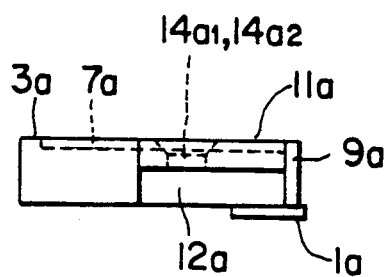
Figure 10A:
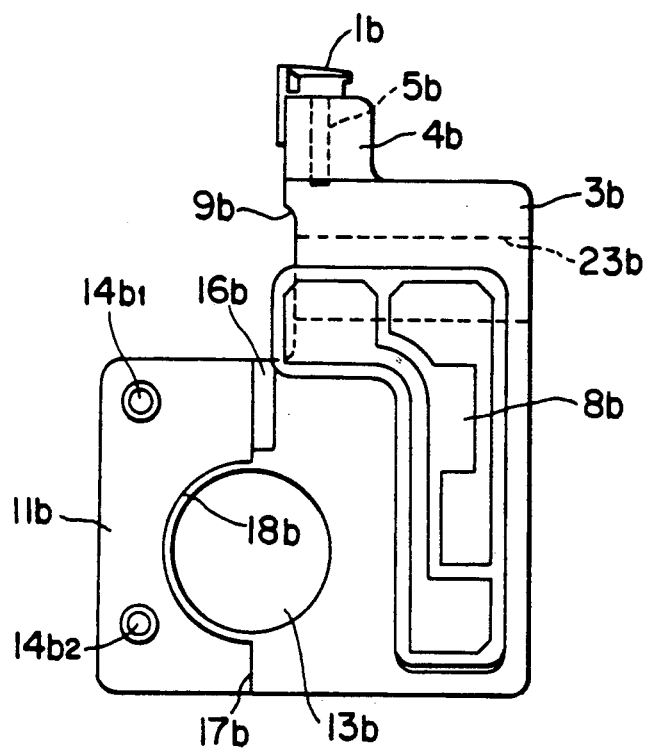
FIGS. 10A, 10B and 10C are a plan view, a rear view and a side view respectively of the magnetic head (shown with the other head base) before the joining stage in the second embodiment.
Figure 10C:
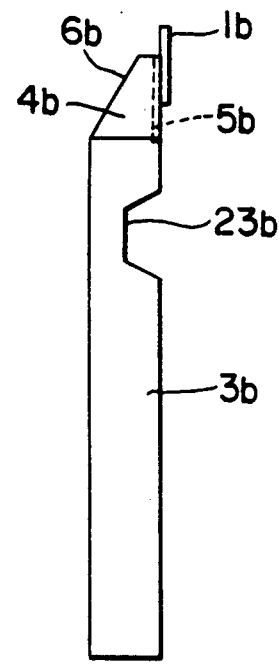
Figure 10B:
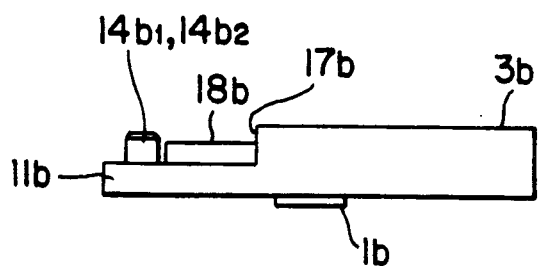

An L-shaped recess $7b$ is formed in the main surface portion $3b$ as in the main surface portion $3a$ of the head base $2a$, in such a manner that a flexible printed circuit board $8b$ can be bonded thereto with an adhesive compound. A step $9b$ is formed on one side $l_b$ (left side in FIGS. 5A and 7A) of the main surface portion $3b$ so that the anchor lug $4b$ slightly projects leftward in the drawing. And a thin joint region $11b$ protruding leftward in the drawing is formed in a manner to extend substantially from the center of one side $l_b$ toward the other end $10b$. The joint region $11b$ is so formed that its thickness $t_b$ from the reverse surface is smaller than the thickness $H_b$ of the main surface portion $3b$, and is slightly lower than the height $h_a$ of the recess $12a$ in the head base $2a$ (to satisfy the dimensional relationship $t_b < h_a < H_b$). And a step $17b$ is formed at the boundary between the joint region $11a$ and the main surface portion $3b$. The head base $2b$ further has a circular aperture $13b$ formed astride the joint region $11b$ and the main surface portion $3b$, wherein semicircular apertures $13b_1$ and $13b_2$ are formed respectively in the main surface portion $3b$ and the joint region $11b$. The diameter $D_b$ of the circular aperture $13b$ is set to be smaller than the diameter $D_a$ of the semicircular aperture $13a$ in the head base $2a$. Also in the joint region $11b$, there is formed a semicircular wall $18b$ which extends along the circumference of the semicircular aperture $13b_2$. The wall $18b$ is so shaped that its outer periphery is smaller than the inner periphery of the semicircular aperture $13a$ in the head base $2a$, and is lower than the step $17b$. In addition, bosses $14b_1$, $14b_2$ are formed at positions to be opposed respectively to the through-holes $14a_1$, $14a_2$ in the joint region $11a$ of the head base $2a$ when the joint region $11b$ is connected to the joint region $11a$ as illustrated in FIG. 8. The outer diameter $d_b$ of such bosses $14b_1$, $14b_2$ is set to be smaller than the inner diameter $da_2$ at the bottoms of the through-holes $14a_1$, $14a_2$. The circular aperture $13b$ has a slope $16b$ on its upper area in the drawing.

The thickness of the head base $2b$ (i.e. the thickness $H_b$ of the main surface portion $3b$) is set to be slightly smaller than the thickness $H_a$ of the head base $2a$ (preferably within a difference range of 0 to 0.1 mm), and the projection length C of the joint region 11b is set to be substantially equal to the width b of the recess 12a in the head base 2a (i.e. the distance from one side $r_a$ to the straight line m). Furthermore, the width d of the joint region 11b is set to be smaller than the length a on one side $r_a$ of the recess 12a in the head base 2a (i.e. the distance from the other end 10a to the straight line l).

In the assembling the magnetic head A of the above constitution, the head chips 1a, 1b are bonded and anchored with an adhesive compound to the reverse surfaces of the anchor lugs 4a, 4b of the two head bases 2a, 2b (reference planes toward the rotary drum). In this stage, if the reverse surfaces of the anchor lugs 4a, 4b are flat, the relative height of the head chips 1a, 1b may be changed due to the thickness of the adhesive compound to consequently induce some deviation between the head chips 1a and 1b. However, in this embodiment where the grooves 5a, 5b are formed on the reverse side of the anchor lugs 4a, 4b, the adhesive compound is led into the grooves 5a, 5b to bond the head chips 1a, 1b while retaining them in close contact with the reverse surfaces of the anchor lugs, hence averting occurrence of any deviation between the head chips 1a and 1b. Subsequently coils (not shown) are wound around the head chips 1a, 1b respectively, and the head characteristic is tested after termination of such coil winding operation. After checking the head characteristic, the head bases 2a, 2b furnished with satisfactory head chips 1a, 1b are joined together by the use of an adhesive compound in a state where the joint regions 11a, 11b thereof are opposed to each other, thereby producing a double azimuth head 1 where the head chips 1a and 1b are disposed mutually opposite with a predetermined transverse space n kept therebetween. The adhesive compound is dripped to predetermined positions of one joint region 11a or 11b and, after mutual connection of the joint regions 11a and 11b, the adhesive compound is injected via the through-holes $14a_1$, $14a_2$ in the joint region 11a. Since the obverse sides of the through-holes $14a_1$, $14a_2$ are tapered to be wider, it is easy to insert the adhesive compound therefrom. In the joining stage, a slight gap k is formed between the joint regions 11a and 11b due to the dimensional relationship $t_b < h_a$ between the height $h_a$ of the recess 12a and the thickness $t_b$ of the joint region 11b, so that the adhesive compound comes to fill the gap k. Accordingly, the respective reverse surfaces of the head bases 2a, 2b can be mutually aligned with facility by pressing the joint regions 11a, 11b against each other.

Also in the joining stage, the semicircular wall 18b formed in the joint region 11b of the head base 2b is opposed to the semicircular aperture 13a in the joint region 11a of the head base 2a, and simultaneously the bosses $14b_1$, $14b_2$ on the joint region 11b are inserted into the through-holes $14a_1$, $14a_2$ in the joint region 11a. Thus, all of the wall 18b and the bosses $14b_1$, $14b_2$ on the joint region 11b, the semicircular aperture 13a and the through-holes $14a_1$, $14a_2$ in the joint region 11a serve as positioning members in the joining stage, thereby remarkably facilitating the joining operation.

Furthermore, since the outer diameter $d_b$ of the bosses $14b_1$, $14b_2$ is smaller than the bottom inner diameter $da_2$ of the through-holes $14a_1$, $14a_2$, the head bases 2a, 2b can be mutually displaced both longitudinally and transversely to facilitate the adjustments of the transverse space n between the head chips 1a and 1b, and also the projection length between the head chips 1a and 1b is rendered adjustable to eventually facilitate alignment of the respective surfaces opposed to the magnetic recording medium. And simultaneously due to the structure where the semicircular aperture 13a is formed in the head base 2a and the circular aperture 13b is formed in the head base 2b, there exists no possibility that the circular aperture 13b is partially closed by the head base 2a despite mutual transverse displacements of the head bases 2a, 2b, hence avoiding an obstacle to the undermentioned attachment executed with screws 19.

Subsequently, the magnetic head A with the head chips 1a, 1b anchored thereto as mentioned above are attached to the rotary drum D as illustrated in FIG. 12, in such a manner that the reference planes of the head bases 2a, 2b toward the rotary drum are retained in contact with the head-base attaching surface (reference plane) of the rotary drum D. Such attachment is carried out by inserting a screw 21 into the circular aperture 13b in the head base 2b. In this stage, the circular aperture 13b serves as a peep hole for checking the attachment position to the rotary drum D. Since the semicircular wall 18b functions to prevent intrusion of the adhesive compound from the joint region into the inner periphery of the circular aperture 13b, it becomes possible to avert the disadvantage that proper insertion of the screw 21 into the circular aperture 13b is impeded by the intrusion of the adhesive compound. In this stage of such attachment, the projection length of a screw used for adjusting the height of the azimuth head is set to its minimum. Although a single screw 22 alone is illustrated in the drawing, practically two screws are provided movably at positions corresponding to the anchor lugs 4a, 4b.

Thereafter the screw 22 is rotated in one direction to project the fore end thereof toward the magnetic head A until contact with the anchor lug 4a or 4b, and then the screw 22 is rotated in both directions to adjust the relative height between the head chips 1a, 1b and also the relative height of the head to the mount surface (reference plane) of the rotary drum D. Such adjustment is executed with respect to another unshown screw in the same manner as the above.

Now a second embodiment of the present invention contrived to facilitate such adjustment of the relative height will be described below with reference to FIGS. 9 through 12, wherein component elements equivalent to those used in the first embodiment are denoted by the same reference numerals and symbols.

In the magnetic head of the second embodiment, there are formed grooves 23a, 23b extending transversely between anchor lugs 4a, 4b and joint regions 11a, 11b on the reverse surfaces of the head bases 2a, 2b (mount surfaces to the rotary drum D). Due to the existence of such grooves 23a, 23b, the anchor lugs 4a, 4b are rendered more flexible to facilitate fine adjustment in the stage of adjusting the height by means of the screw 22 shown in FIG. 12. Such grooves 23a, 23b may be semicircular, triangular, rectangular or trapezoidal as illustrated in FIG. 11 or may be formed into any of other various shapes.

Hereinafter a third embodiment of the present invention will be described with reference to FIGS. 13, 14 and 15.

Figure 13:
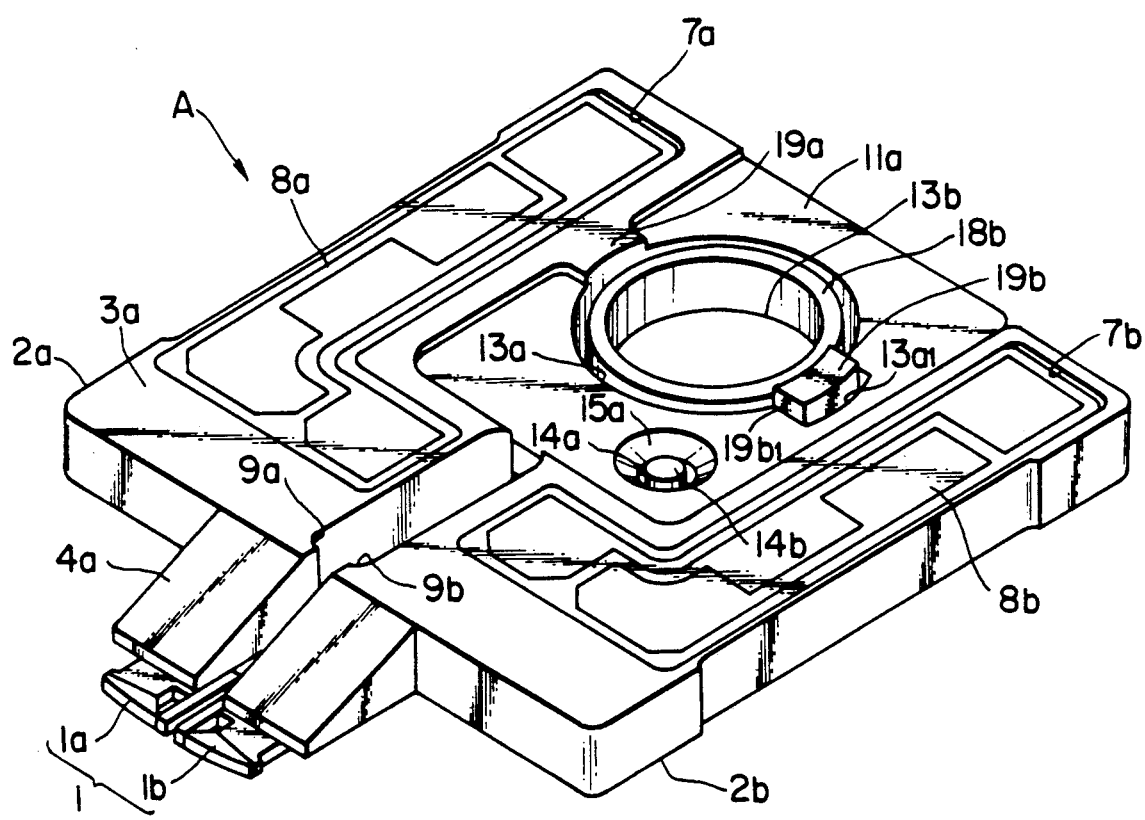
FIG. 13 is an assembled perspective view showing the constitution of a magnetic head contrived as a third embodiment of the invention.

FIG. 13 is a perspective view of a magnetic head A embodying the invention; FIG. 14 is an exploded perspective view of the same magnetic head; and FIG. 15 is a side view of the magnetic head fixed by tightening a screw.

In this embodiment, the individual head bases are subjected to the screw-tightening pressure and are thereby attached uniformly to the rotary drum.

Figure 14:
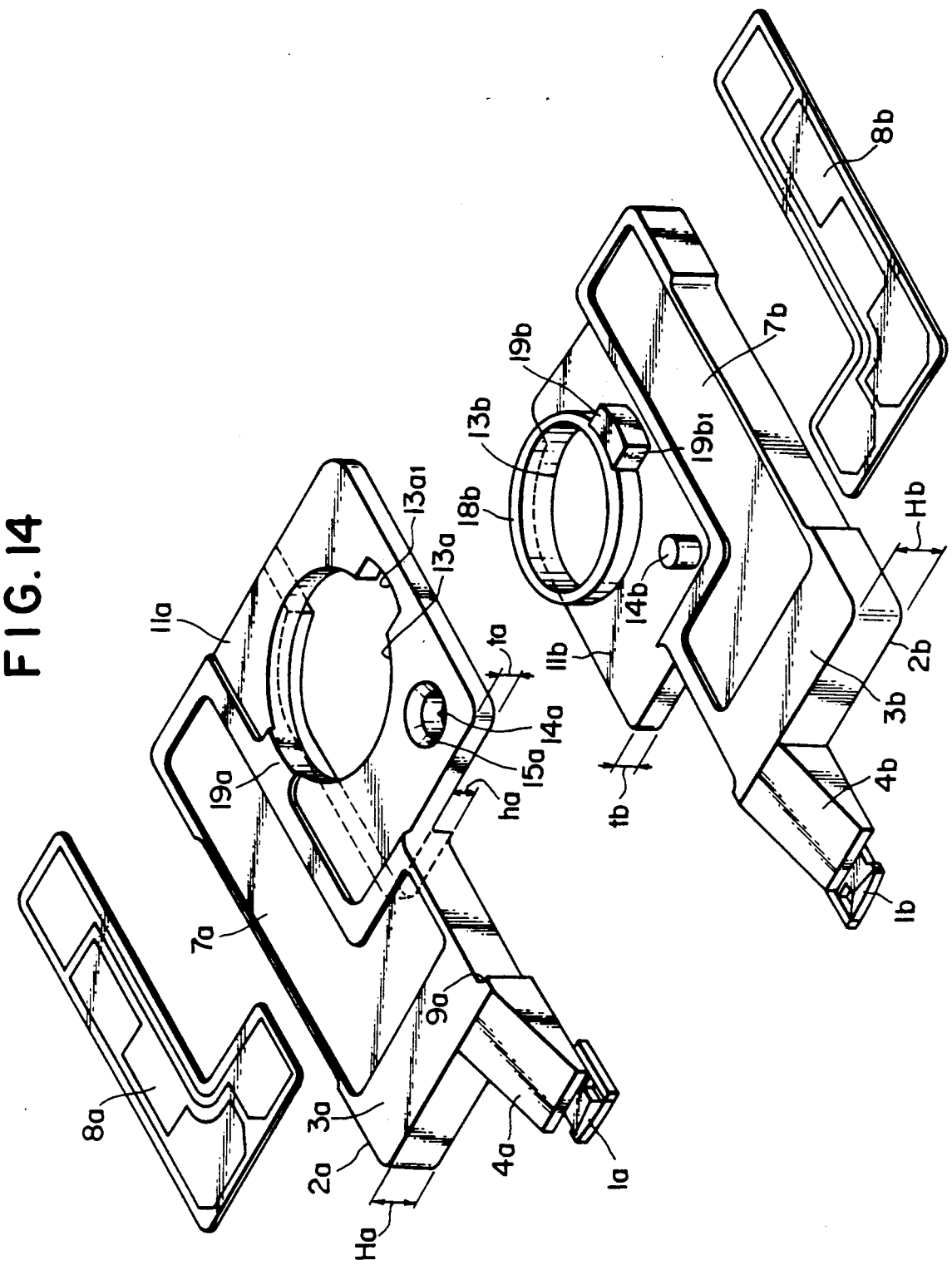
FIG. 14 is an exploded perspective view of the magnetic head shown in FIG. 13.
Figure 15:
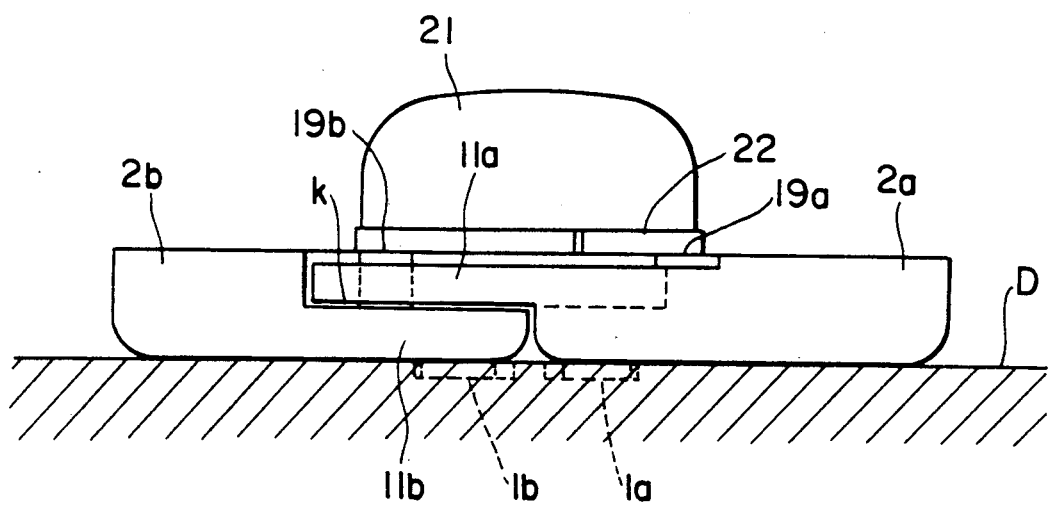
FIG. 15 is a side view illustrating how the magnetic head is fixed to the rotary drum by means of a screw.
Figure 16:
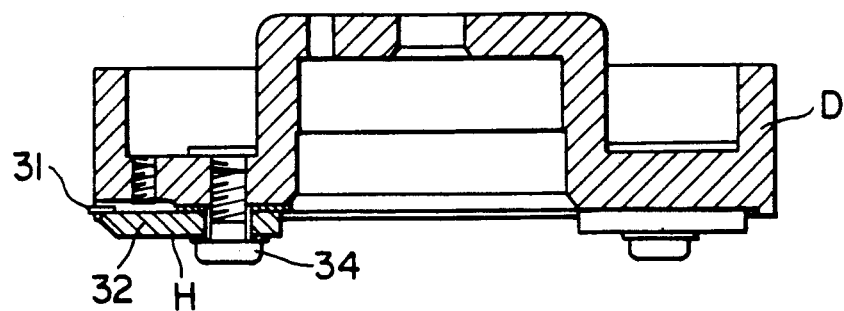
FIG. 16 is a sectional view illustrating how the magnetic head is attached to the rotary drum in a conventional example.
Figure 18:
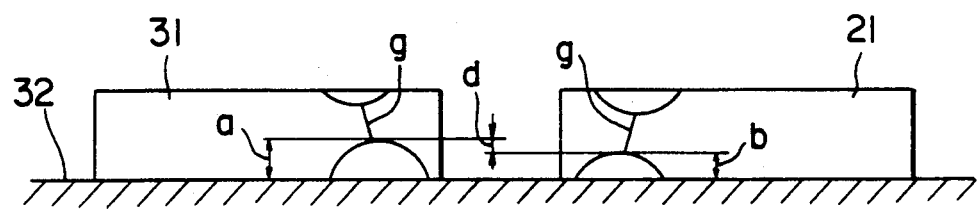
FIG. 18 is an enlarged view showing a gap portion in the magnetic head.
Figure 17A:
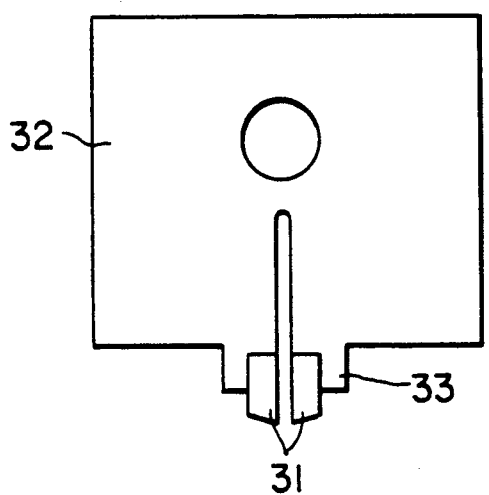
FIGS. 17A, 17B and 17C are a plan view, a front view and a side view respectively of the conventional example.
Figure 17C:
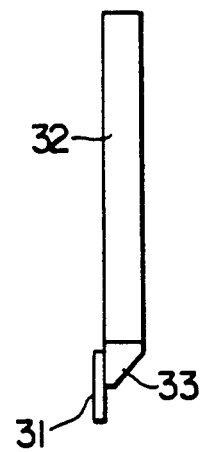
Figure 17B:
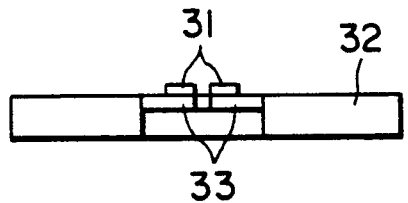

In FIGS. 13 through 15, any component elements equivalent to those used in the first embodiment are denoted by the same reference numerals and symbols.

In the third embodiment, a circular aperture 13b is formed at the center of a joint region surface of each head base, and joint regions 11a, 11b are provided around the entire periphery of such circular aperture. One head base 2a is so formed that the obverse surface of the joint region 11a becomes lower than the main surface portion 3a.

A circular aperture 13a with a recess 13a₁ is formed at the center of the joint region 11a, and a support surface 19a flush with the main surface portion 3a is formed between the periphery of such circular aperture 13a and the aforementioned L-shaped recess 7a.

Meanwhile in the other head base 2b, a circular aperture 13b is formed at the center of its joint region surface, and also a cylindrical wall 18b, whose outer circumference is smaller in diameter than the inner circumference of the circular aperture 13a in the head base 2a, is formed along the circumference of the circular aperture 13b.

Furthermore, adjacent to the outer peripheral surface of the cylindrical wall 18b, there is formed a boss 19b₁ having a support surface 19b which is flush with the support surface 19a formed in one head base 2a.

The support surface 19a and the boss 19b₁ having the support surface 19b are disposed at symmetrical positions with respect to the circular aperture 13a.

The joined magnetic head is attached to a rotary drum as illustrated in FIG. 15.

Such attachment is executed by inserting a screw 21 into the circular aperture 13b formed in the head base 2b.

When the screw 21 is tightened in this state, its head or actually a washer 22 placed under the head is pressed against the respective support surfaces 19a, 19b of the head bases 2a, 2b, so that the tightening pressure is applied to both the support surfaces 19a, 19b. Consequently, the head bases 2a, 2b are directly pressed individually to the head-base mounting surface D and are thereby attached uniformly to the surface D.

According to the above-described first, second and third embodiments, the operation of winding coils around the pair of head chips 1a, 1b can be performed in a state where the head chips 1a, 1b are bonded and anchored to individual head bases 2a, 2b, so that the winding procedure need not be executed under the condition that the head chips are held in the proximity of each other while a minute space is retained therebetween as in the conventional art, and thus the attachment of the head chips 1a, 1b to the head bases 2a, 2b can be automated while realizing automation of the coil winding procedure.

After winding the coils, the head characteristic can be confirmed with respect to each of the head chips 1a and 1b, so that even if one head chip 1a or 1b is found to be defective, discarding the other head chip 1b or 1a can be averted to eventually eliminate the conventional waste.

Since the two head chips 1a, 1b are anchored to the reference planes of the head bases 2a, 2b toward the rotary drum and such reference planes are mounted on the head-base attaching surface (reference plane) of the rotary drum D, there is attainable a coincidence between the attaching surface for the two head chips 1a, 1b and the head-base attaching surface (reference plane) of the rotary drum, hence facilitating the height adjustment of the head chips 1a, 1b to the reference plane of the rotary drum to consequently enhance the precision in the direction of height.

Furthermore, proper positioning can be executed with facility in the joining stage due to the contrivance that the joint regions 11a, 11b of the head bases 2a, 2b are shaped to be thin, and a semicircular aperture 13a and through-holes 14a₁, 14a₂ are formed in one joint region 11a, while in the other joint region 11b, there are formed a circular aperture 13b astride the main surface portion 3b, bosses 14b₁, 14b₂ of a diameter smaller than the inner diameter da₂ of the through-holes 14a₁, 14a₂, and a semicircular wall 18b extending along the semicircular aperture 13b₂ of the circular aperture 13b proximate to the joint region 11b. In addition, intrusion of the adhesive compound into the inner periphery of the circular aperture 13b is preventable to consequently eliminate any impediment that may otherwise be caused to the attachment by screws to the rotary drum D after the joining stage. Moreover, the relative height and the transverse space n between the head chips 1a, 1b can be adjusted, and the projection lengths of the head chips 1a, 1b can be corrected simultaneously with the stage of joining the head bases 2a, 2b to each other, whereby the precision thereof is also enhanced.

Besides the above, in the second embodiment where the grooves 23a, 23b are formed in the head bases 2a, 2b, it is possible to easily adjust the relative height between the head chips 1a, 1b and the relative height to the mount surface (reference plane) of the rotary drum D, hence realizing further enhancement of the precision.

The head bases 2a, 2b are composed of a conductive material so as to be groundable. Preferred conductive materials for such purpose may be selected out of iron alloys (containing Si Al, Ni, Co), aluminum and its alloy, copper and its alloy, and ceramics (with conductivity retained on the surface or particles).

According to the magnetic head of the present invention, a pair of head chips are bonded and anchored respectively to two head bases produced as individual members, and a double azimuth head is constituted of the head chips on one surface formed by joining the two head bases to each other, so that the operation of winding coils around the head chips can be automated and, even in case one of the par of head chips is found to be defective, discarding the other satisfactory head chip is avertable to consequently eliminate the waste observed heretofore in the prior art. Furthermore, the dimensional precision can be enhanced in three directions (with regard to the relative height of the magnetic head to the rotary drum and the relative height between the two head chips; the projection lengths of the two head chips for aligning the surfaces thereof opposed to a magnetic recording medium; and the transverse space between the head chips).

What is claimed is:

1. A double base type double azimuth magnetic head comprising two head bases and a pair of head chips 1a, 1b bonded and anchored thereto respectively, said two head bases having integral anchor lugs 4a, 4b with flat reverse surfaces for anchoring the head chips thereto, said head bases further having joint surface plane regions 11a, 11b, said head bases being joined to each other as said joint surface regions in such a manner that said anchor lugs are placed mutually adjacent in a same direction and the flat reverse surfaces of said anchor lugs become flush with each other, wherein the pair of anchored head chips are so disposed as to constitute a double azimuth head while being positioned mutually adjacent on one line parallel to the plane of said joint surface plane regions with a predetermined gap left therebetween, and said head bases each having shaped portions 13a, 13b which in combination form a screw-setting circular aperture in the joined head bases for attachment to a rotary drum.

2. A magnetic head according to claim 1, wherein flexible printed circuit boards 8a, 8b are stuck to said head bases.

3. A magnetic head according to claim 1, wherein each of said anchor lugs is disposed at one end of said head base in a manner to project laterally beyond any said portions and has a groove 5a (5b) in the reverse surface thereof.

4. A magnetic head according to claim 1, wherein said screw-setting circular aperture is obtained by said combination of said shaped portions comprising a semicircular recess formed in one head base and a circular aperture formed in the other head base, said combination being attained with a mutual positional coincidence.

5. A magnetic head according to claim 4, wherein said joint surface regions are provided adjacent said screw-setting circular aperture.

6. A magnetic head according to claim 1, wherein one head base 2a of said two head bases 2a, 2b is shaped to be thicker by 0 to 0.1 mm than the other head base 2b and has a recess 12a of a height $h_a$ on one side, thereby forming a joint region 11a thinner than the head base, while the other head base 2b has a recess on the opposite side to form a joint region 11b of a thickness $t_b$ thinner than the head base; the height $h_a$ of the recess formed in one head base 2a is set to be slightly greater than the thickness $t_b$ of the joint region 11b in the other head base 2b but to be smaller than the thickness $H_a$, $H_b$ of the head bases to maintain the dimensional relationship of $H_a \geq H_b > h_a > t_b$; and said joint regions 11a, 11b are mutually superposed and joined.

7. A magnetic head according to claim 6, wherein said head base 2b which is the thinner of said two head bases between said screw-setting circular aperture 13b and the surface of said joint region, an arcuate wall 18b extending along said circular aperture so as to prevent inflow of an adhesive bonding compound into the circular aperture, and an outer circumference of said arcuate wall is smaller in diameter than an inner circumference of said circular aperture 13a formed in head base 2a.

8. A magnetic head according to claim 6, wherein positioning through-holes $14a_1$, $14a_2$ are formed in said joint region 11a of one head base 2a, while bosses $14b_1$, $14b_2$ are formed in said thin joint region 11b of the other head base 2b at positions corresponding to said through-holes, said bosses having an outside diameter smaller than the inside diameter of said through-holes so as to be fittable therein.

9. A magnetic head according to claim 1, wherein said head bases 2a, 2b have, on said reverse surfaces, between the anchor lugs 4a, 4b and the joint regions 11a, 11b, grooves 23a, 23b extending in the direction of alignment of the head chips arrayed in the joining regions.

10. A double base type double azimuth magnetic head comprising two head bases and a pair of head chips 1a, 1b bonded and anchored thereto respectively, said two head bases integrally having integral anchor lugs 4a, 4b with flat reverse surfaces for anchoring the head chips thereto, said head bases further having joint surface plane regions 11a, 11b said head bases being joined to each other at said joint surface regions in such a manner that said anchor lugs are placed mutually adjacent in a same direction and the reverse surfaces of said anchor lugs become flush with each other, wherein the pair of anchored head chips are so disposed as to constitute a double azimuth head while being positioned mutually adjacent on one line parallel with said joint surface plane regions with a predetermined gap left therebetween, and said head bases each having shaped portions 13a, 13b which form a screw-setting circular aperture in the joined head bases for attachment to a rotary drum; and said head bases 2a, 2b further each has a screw-setting support surface 19a, 19b adjacent said circular aperture in such a manner that said support surfaces are formed integrally to each head base and the support surfaces have the same height from a reference plane when joined together.

11. A magnetic head according to claim 10, wherein flexible printed circuit boards 8a, 8b are stuck to said head bases.

12. A magnetic head according to claim 10, wherein each of said anchor lugs is disposed at one end of said head base in a manner to project laterally beyond any of said portions and has a groove 5a (5b) in the reverse surface thereof.

13. A magnetic head according to claim 10, wherein said shaped portions which form said screw-setting circular aperture are formed at respective centers of the joint surface regions of said head bases, and the joint surface regions surround said circular aperture.

14. A magnetic head according to claim 10, wherein one head base 2a of said two head bases 2a, 2b is shaped to be thicker by 0 to 0.1 mm than the other head base 2b and has a recess 12a of a height $h_a$ on its reverse side, thereby forming a joint region 11a thinner than the head base, while a other head base 2b has a recess on the main surface side to form a joint region 11b of a thickness $t_b$ thinner than the head base; the height $h_a$ of the recess formed in one head base 2a is set to be slightly greater than the thickness $t_b$ of the joint region 11b in the other head base 2b but to be smaller than the thickness $H_a$, $H_b$ of the head bases to maintain the dimensional relationship of $H_a \geq H_b > h_a > t_b$; and said joint regions 11a, 11b are mutually superposed and joined.

15. A magnetic head according to claim 10, wherein one of said head bases 2b has between said screw-setting circular aperture 13b and a surface of said joint surface region, an arcuate wall 18b adjacent said circular aperture so as to prevent inflow of an adhesive bonding compound into said circular aperture, and an outer diameter of said arcuate wall is smaller than an inner diameter of said screw-setting circular aperture.

16. A magnetic head according to claim 10, wherein positioning through-holes $14a_1$, $14a_2$ are formed in said joint surface region 11a of one head base 2a, while bosses $14b_1$, $14b_2$ are formed in said joint surface region 11b of the other head base 2b at positions corresponding to said through-holes, said bosses having a diameter smaller than a diameter of said through-holes so as to be fittable therein.

* * * * *